Sept. 3, 1929.  M. J. HINES  1,726,667
COMBINED HARVESTER AND THRASHER
Filed Sept. 17, 1926   4 Sheets-Sheet 1
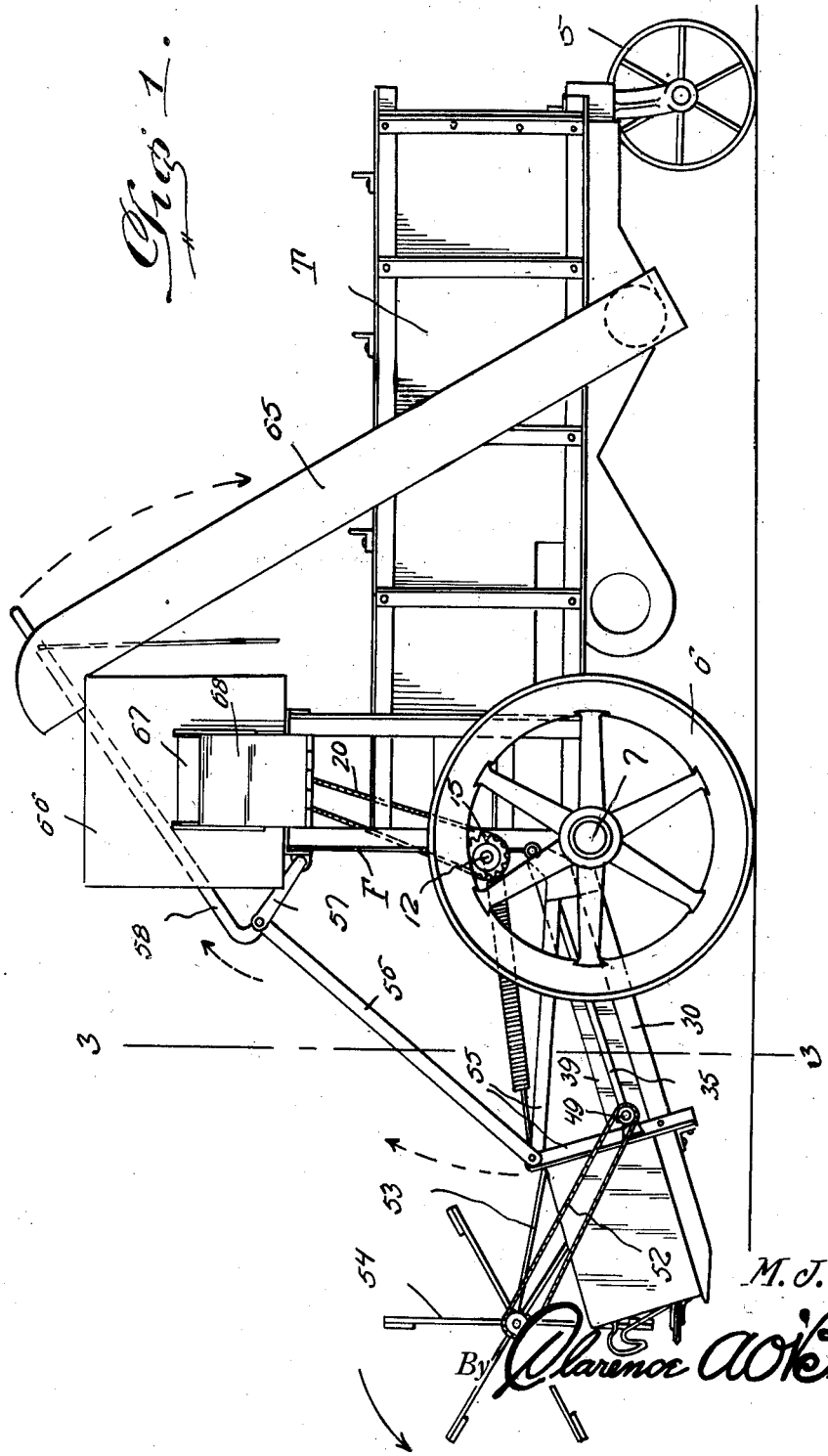
Inventor
M. J. Hines,
By Clarence A. O'Brien
Attorney Sept. 3, 1929. M. J. HINES 1,726,667
COMBINED HARVESTER AND THRASHER
Filed Sept. 17, 1926  4 Sheets-Sheet 2
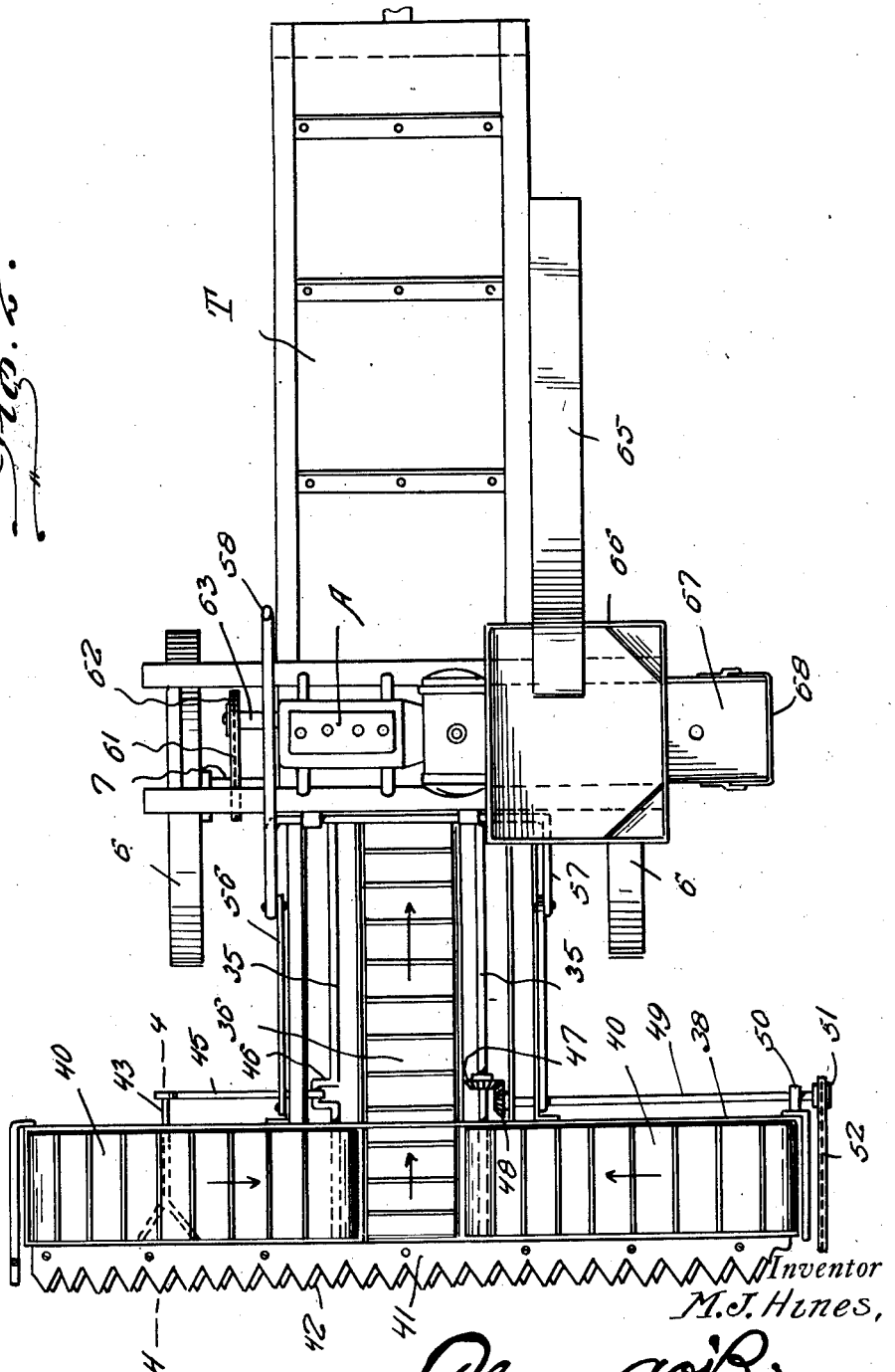

Sept. 3, 1929.  M. J. HINES  1,726,667
COMBINED HARVESTER AND THRASHER
Filed Sept. 17, 1926   4 Sheets-Sheet 3
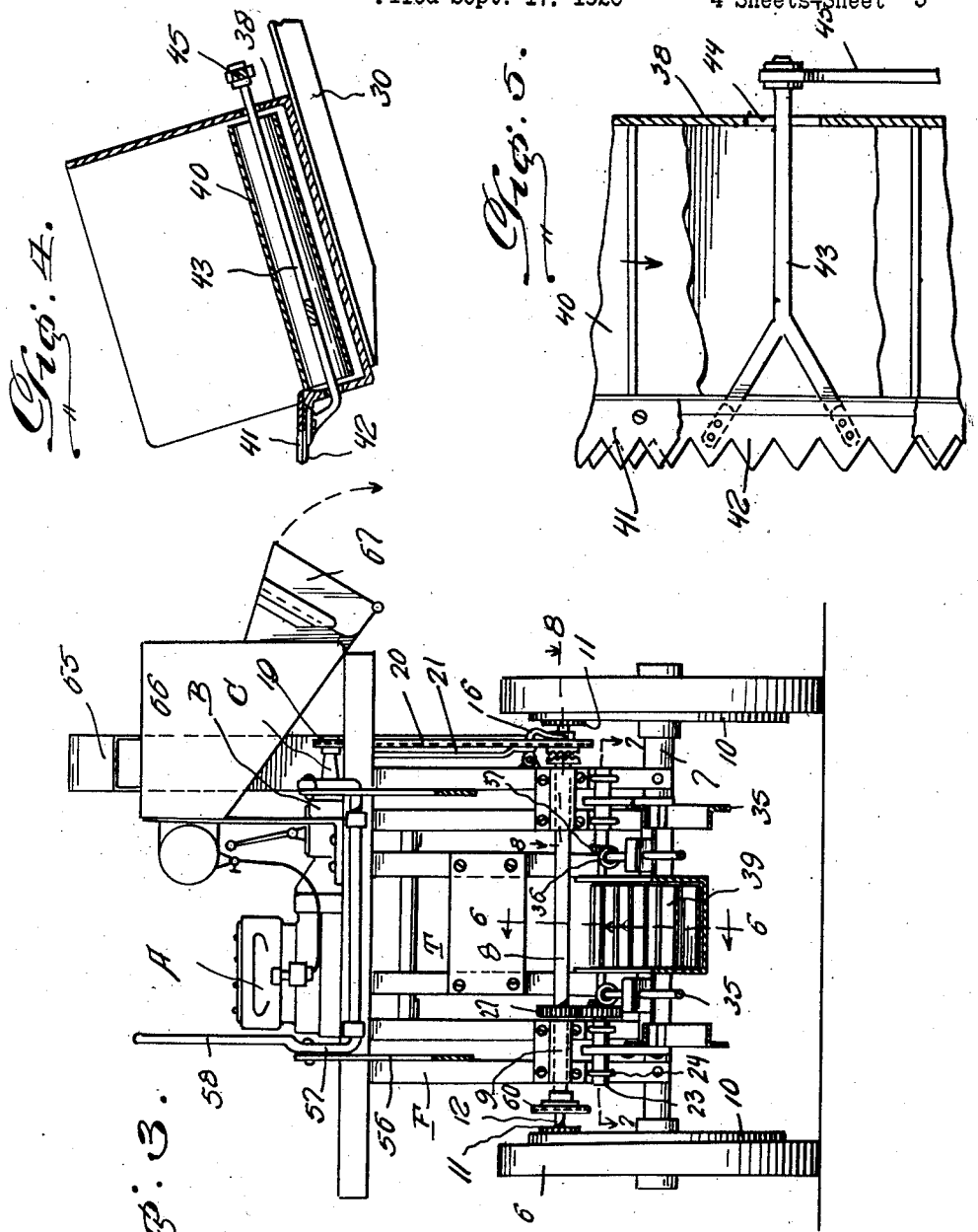
Inventor
M. J. Hines,
By Clarence A. O'Brien
Attorney Sept. 3, 1929. M. J. HINES 1,726,667
COMBINED HARVESTER AND THRASHER
Filed Sept. 17, 1926 4 Sheets-Sheet 4
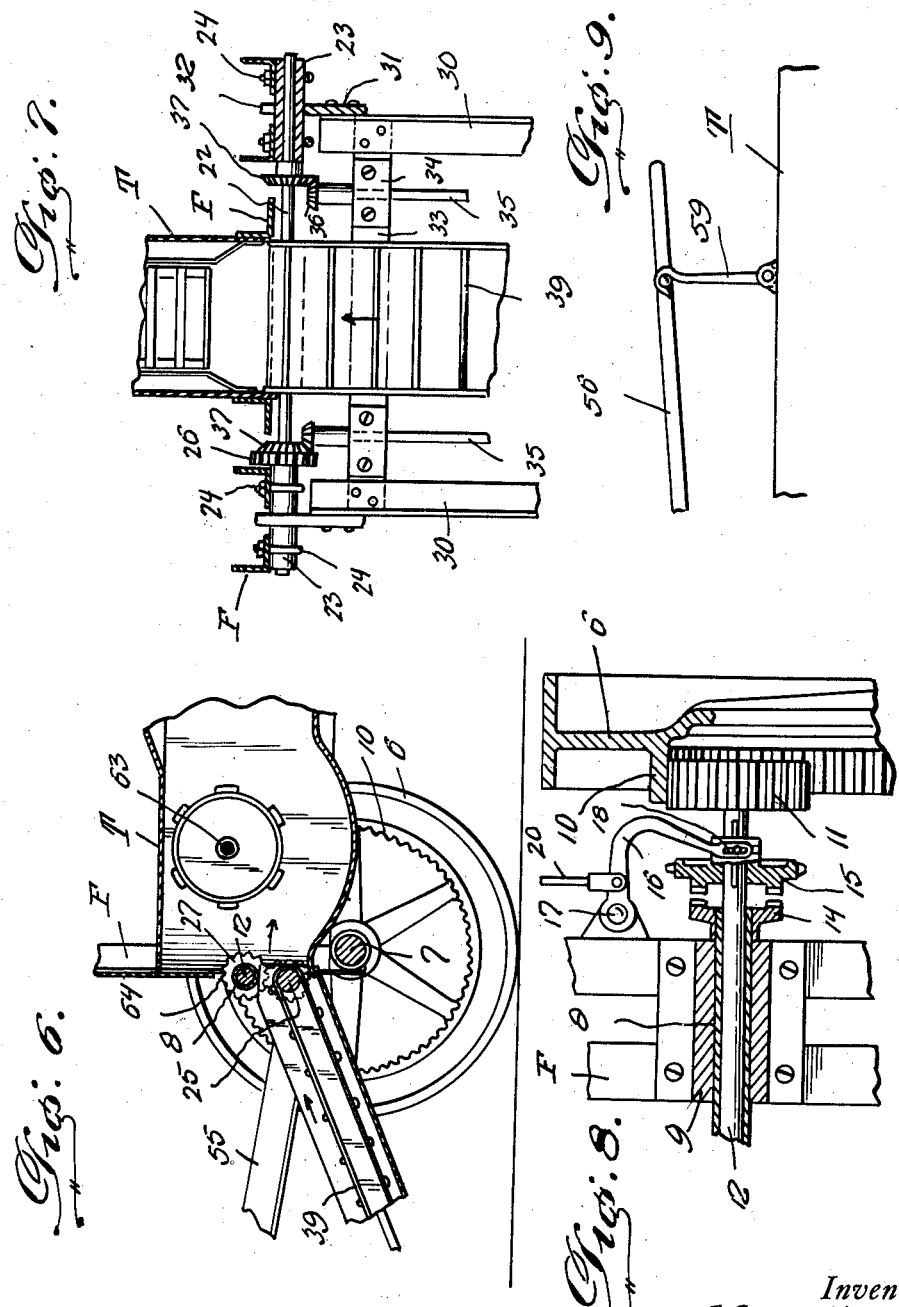
Inventor
M. J. Hines,
By Clarence A. O'Brien
Attorney Patented Sept. 3, 1929.

1,726,667

UNITED STATES PATENT OFFICE.

MICHAEL J. HINES, OF HUTCHINSON, KANSAS, ASSIGNOR OF ONE-HALF TO ALLEN WEBBER, OF DODGE CITY, KANSAS.

COMBINED HARVESTER AND THRASHER.

Application filed September 17, 1926. Serial No. 136,133.

The present invention relates to a combined harvester and thrasher and has for its prime object to provide an exceedingly compact structure of this nature which may be conveniently and easily operated and which may be manufactured at a comparatively low cost.

Another very important object of the invention lies in the provision of a mechanism of this nature which is simple in its construction, thoroughly reliable and efficient in its operation and well adapted to the purpose for which it is designed.

A still further very important object of the invention lies in the provision of a harvesting mechanism which is swingably mounted on the thrasher mechanism in such a manner as to be quick detachable.

A further object of the invention is to provide a harvester mechanism which includes a cutter, a feeder or reel associated with conveying mechanisms for delivering the wheat, grain, or the like to the thrasher.

Another object of the invention lies in the provision of a thrasher with an elevator to deliver the material to a hopper mounted on top of the thrasher and having a chute associated therewith so that the material in the hopper may be conveniently gravitated into a wagon or the like.

With the above and numerous other objects in view as will appear as the description proceeds, the invention resides in certain novel features of construction and in the combination and arrangement of parts as hereinafter more fully described and claimed.

In the drawing:

Figure 1 is a side elevation of the combined harvester and thrasher embodying the features of my invention, Fig. 2 is a top plan view thereof, Fig. 3 is a vertical transverse section taken substantially on the line 3—3 of Fig. 1, Fig. 4 is a detail view taken substantially on the line 4—4 of Fig. 2, Fig. 5 is a fragmentary top plan view partly in section of the cutter mechanism, Fig. 6 is a detail fragmentary section taken vertically through the harvester and thrasher at their connection, said section being substantially struck on the line 6—6 of Fig. 3, Fig. 7 is a horizontal section taken substantially on the line 7—7 of Fig. 3 looking downwardly, Fig. 8 is a detail horizontal section taken substantially on the line 8—8 of Fig. 3, Fig. 9 is a detail elevation of one end of the operating lever with a hook to hold the same in a desired position.

Referring to the drawing in detail it will be seen that the letter T denotes generally a thrasher the major portion of which is of conventional construction and will not be described in detail. The rear end of the thrasher T is mounted on caster wheels 6 while the front end is supported by bull wheels 6 journaled for rotation on the front axle 7. The wheels 6 are formed on their inner sides with internal gears 10 with which mesh pinions 11. The pinions 11 are carried by a shaft 12 journaled through a hollow shaft 8. The hollow shaft 8 is journaled in bearings 9 carried by the vertical frame structure F at the front of the thrasher T. A clutch segment 14 is fixed to the hollow shaft 8. A combined sprocket and clutch segment 15 is splined on the shaft 12 and is operable by a rockable member 16 mounted as at 17 on the frame F and having a pin and slot connection 18 with the combined clutch segment and sprocket 15. An internal combustion engine or any other suitable prime mover is denoted by the letter A and includes a transmission mechanism B for driving the shaft C on which is mounted the sprocket 19. A chain 20 is trained over the sprocket 19 and over the sprocket portion of the clutch segment and sprocket 15. When the shaft C is rotated through the intermediacy of the transmission mechanism B and internal combustion engine A, it will be seen that the shaft 12 is in operation, thereby rotating the bull wheels 6 through the intermediacy of pinions 11 and gears 10. The hollow shaft 8 will remain stationary unless the gear segments are in engagement with each other. The combined gear segment and sprocket 15 is shiftable through the rockable member 16 and a rod 21.

A shaft 22 is journaled in bearings 23 carried by clamps or other suitable means 24 on the frame F and the intermediate portion of this shaft has fixed thereon coaxially therewith a drum 25 which may be merely an enlargement of the shaft. A gear 26 is fixed to the shaft 22 and meshes with a gear 27 (see Fig. 3) carried on the hollow shaft 8. The numeral 30 denotes the side bars of the harvester which are provided at their upper rear ends with extensions 31 in the form of plates having notched extremities 32 for extending over the bearings 23. A cross member 33 extends between the side bars 30 adjacent the extension 31 and has bearings 34 mounted thereon one adjacent to each side bar. Shafts 35 are journaled in the bearings 34 and extend longitudinally in parallelism with the side bars 30. At the upper ends of these shafts 35 there are fixed beveled gears 36 which mesh with beveled gears 37 fixed to the shaft 22. A transversely extending frame structure 38 is mounted at the lower ends of the side bars 30. An endless elevator 39 is mounted between the side bars 30 to extend longitudinally therewith and is trained about the roller 25 and about a similar roller (not shown) mounted in the frame 38. Transversely disposed endless conveyors 40 are mounted in the frame 38, one on each side of the elevator 39. A stationary cutter bar 41 is attached to the front of the frame 38 and a movable cutter bar 42 is mounted therebelow for transfer to rectilinear motion in respect to the machine. A bracket arm 43 is engaged with the movable cutter bar 42 and extends through a slot 44 in the frame 38 and is connected with a piston 45 engaged on the crank 46 of one of the shafts 35. The other shaft 35 has mounted thereon a beveled gear 47 which meshes with a beveled gear 48 on a shaft 49 journaled in bearings 50 on the frame 38 and having a sprocket 51 at its outer end over which is trained a cam 52. The shafts 35 have the endless conveyors 40 trained thereover to be operated thereby as clearly indicated in dotted lines in Fig. 2. Brackets 53 have mounted therein a feeder or reel 54 having a sprocket associated therewith over which is trained the chain 52. This feeder should be located above the cutting mechanism.

Rods 55 are attached to the frame of the harvester and are engaged by link rods 56 which engage cranks 57 mounted on the upper portion of the frame F. One of the cranks 57 has an angular extension in the form of an operating lever 58 which may be swung downwardly for engagement by the hook 59 at which time the harvesting mechanism will be in a raised position. A sprocket 60 is mounted on the shaft 8 and a chain 61 is trained thereover and also over a sprocket 62 on the shaft 63 which operates the thrasher R. This thrasher T has the entrance 64 at the upper end of the elevator 35. The thrasher as such is of conventional construction or any other preferred construction and needs no detailed explanation here. An elevator 65 forms the outlet of the thrasher and leads to a hopper 66 carried at the top of the frame F. The bottom of the hopper is inclined to one side as clearly indicated in Fig. 3 and has associated therewith a spout 67 with a hinged door 68.

When running the machine to and from the field the combined clutch segment and sprocket 15 is disengaged from the clutch segment 14 and therefore the shaft 12 will merely cause the rotation of the wheel 6 as heretofore indicated when the prime mover is connected therewith in the manner previously indicated. When the machine is in the field and is to be placed in operation for harvesting and thrashing, the combined gear segment and sprocket 15 is engaged with the gear segment 14 thereby placing in rotation the hollow shaft 8. When the hollow shaft 8 is rotating the gears 27 and 26 impart rotary motion to the shaft 22 thereby causing the operation of the elevating mechanism 39 and the conveying mechanism 40 as heretofore indicated and simultaneously causing the operation of the cutting mechanism and the feeder as heretofore indicated. Thus the wheat, grain, or the like will be delivered to the thrasher through the entrance 64. The wheat, grain, or the like will be thrashed in the thrasher T and delivered through the elevator 65 into the hopper 60 from which it may be delivered by gravity through the spout 67 to wagons, or the like.

It is thought that the construction, operation, and advantages of the invention will now be clearly understood without a more detailed description. It is desired to point out that the arrangement of the parts is convenient and compact so that the various parts may be made simple for operating in a thoroughly efficient and reliable manner. The device is capable of easy manipulation since the harvesting mechanism may be swung up into an out-of-the-way position when the machine is being moved to or from the field or being moved from one field to the other.

The present embodiment of the invention has been disclosed in detail merely by way of example, since in actual practice it has attained the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described my invention what I claim as new is:

1. A combined harvester and thrasher of the class described, including, in combination, a wheeled frame, a thrasher mechanism mounted on the wheeled frame, a supporting device at the forward end of the wheeled frame, a harvester mechanism frame having extensions provided with notches, a shaft on the supporting device for extending through said notches to rockably mount the harvester mechanism frame in relation to the wheeled frame, an elevating mechanism on the harvester mechanism frame extended longitudinally thereof, a pair of transversely disposed conveying mechanisms mounted on the harvester mechanism frame one to each side of the elevator.

2. A combined harvester and thrasher of the class described, including, in combination a wheeled frame, a thrasher mechanism mounted on the wheeled frame, a supporting device at the forward end of the wheeled frame, a harvester mechanism frame having extensions provided with notches, a shaft on the supporting device for extending through said notches to rockably mount the harvester mechanism frame in relation to the wheeled frame, an elevating mechanism on the harvester mechanism frame extending longitudinally thereof, a pair of transversely disposed conveying mechanisms mounted on the harvester mechanism frame one to each side of the elevator, means associated with said shaft for operating the elevator mechanism, the conveyors, and the cutter mechanism.

3. A combined harvester and thrasher of the class described, including in combination, a wheeled frame, a thrasher mechanism mounted on the wheeled frame, a supporting device at the forward end of the wheeled frame, a harvester mechanism frame having extensions provided with notches, a shaft on the supporting device for extending through said notches to rockably mount the harvester mechanism frame in relation to the wheeled frame, an elevating mechanism on the harvester mechanism frame extending longitudinally thereof, a pair of transversely disposed conveying mechanisms mounted on the harvester mechanism frame one to each side of the elevator, a feeder mechanism mounted above the cutter mechanism, and means for simultaneously driving the feeder mechanism, the cutter mechanism, the conveyor mechanisms, and the elevator mechanism from the shaft.

4. In combination, a wheeled thrashing machine, a harvester mechanism, notched extensions on the harvester mechanism, a shaft journaled on the thrashing machine for receiving the notched extensions to rockably mount the harvester mechanism on the thrashing machine, means for raising and lowering the harvesting mechanism in relation to the thrashing machine.

5. In combination, a wheeled thrashing machine, a harvester mechanism, notched extensions on the harvester mechanism, a shaft journaled on the thrashing machine for receiving the notched extensions to rockably mount the harvester mechanism on the thrashing machine, means for raising and lowering the harvesting mechanism in relation to the thrashing machine, and means on the thrashing machine for rotating the shaft, and means operable by the shaft for operating the harvester mechanism.

6. In combination, a wheeled thrashing machine, a harvester mechanism, notched extensions on the harvester mechanism, a frame rising from one end of the wheeled thrashing machine, a shaft journaled in the lower portion of the frame for receiving the notched extensions and rockably mount the harvester mechanism on the thrashing machine, a crank pivotally engaged on the upper portion of the frame and having an angular extension, a link connecting the crank with the harvesting mechanism, and a hook on the thrashing machine with which the extension of the crank may be engaged on the harvester mechanism swung in a raised position.

In testimony whereof I affix my signature.

MICHAEL J. HINES.